United States Patent
Thornewell et al.

(10) Patent No.: US 9,106,699 B2
(45) Date of Patent: *Aug. 11, 2015

(54) METHODS FOR HANDLING REQUESTS BETWEEN DIFFERENT RESOURCE RECORD TYPES AND SYSTEMS THEREOF

(75) Inventors: Peter M. Thornewell, Seattle, WA (US); Christopher R. Baker, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 568 days.

This patent is subject to a terminal disclaimer.

(21) Appl. No.: 12/939,377

(22) Filed: Nov. 4, 2010

(65) Prior Publication Data

US 2012/0117379 A1    May 10, 2012

(51) Int. Cl.
*H04L 29/06* (2006.01)
*H04L 29/12* (2006.01)

(52) U.S. Cl.
CPC ...... *H04L 61/1511* (2013.01); *H04L 29/12066* (2013.01); *H04L 29/12367* (2013.01); *H04L 61/2514* (2013.01); *H04L 63/123* (2013.01); *H04L 69/167* (2013.01)

(58) Field of Classification Search
CPC ... H04L 63/10; H04L 69/167; H04L 61/2514; H04L 61/1511; H04L 29/12066; H04L 63/123; H04L 29/12367
See application file for complete search history.

(56) References Cited

U.S. PATENT DOCUMENTS

| | | |
|---|---|---|
| 5,958,053 A | 9/1999 | Denker |
| 6,119,234 A * | 9/2000 | Aziz et al. ............... 726/11 |
| 7,028,182 B1 | 4/2006 | Killcommons |
| 7,299,491 B2 | 11/2007 | Shelest et al. |
| 7,620,733 B1 | 11/2009 | Tzakikario et al. |
| 7,921,211 B2 | 4/2011 | Larson et al. |
| 7,941,517 B2 * | 5/2011 | Migault et al. ............... 709/223 |
| 8,266,427 B2 * | 9/2012 | Thubert et al. ............... 713/162 |
| 8,281,383 B2 * | 10/2012 | Levy-Abegnoli et al. ...... 726/11 |
| 8,289,968 B1 | 10/2012 | Zhuang |
| 2002/0103916 A1 | 8/2002 | Chen et al. |
| 2003/0074434 A1 | 4/2003 | Jason et al. |
| 2005/0125195 A1 | 6/2005 | Brendel |
| 2007/0214503 A1 | 9/2007 | Shulman et al. |

(Continued)

FOREIGN PATENT DOCUMENTS

| | | |
|---|---|---|
| WO | 2009052668 A1 | 4/2009 |
| WO | 2009052688 A1 | 4/2009 |

OTHER PUBLICATIONS

RFC 2767, Dual Stack Hosts using the "Bump-In-the-Stack" Technique (BIS), Tsuchiya et al., Network Working Group, Feb. 2000.*
RFC 4034, DNS Security Introduction and Requirements, Arends et al., Network Working Group, Mar. 2005.*
RFC 4035, Protocol Modifications for the DNS Security Extensions, Arends et al., Network Working Group, Mar. 2005.*

(Continued)

*Primary Examiner* — Jeffery Williams
*Assistant Examiner* — Christopher C Harris
(74) *Attorney, Agent, or Firm* — LeclairRyan, a Professional Corporation

(57) ABSTRACT

A method, computer readable medium, and device for handling requests between different resource record types includes receiving at a traffic management device a first resource record type from one or more server devices in response to a request from a client device. The traffic management device validates the first resource record type, and creates a second resource record type corresponding to the first resource record type after the validating. Signing the second resource record type at the traffic management device is carried out for servicing the request from the client device.

21 Claims, 3 Drawing Sheets

(56) References Cited

U.S. PATENT DOCUMENTS

| | | | |
|---|---|---|---|
| 2008/0137659 A1* | 6/2008 | Levy-Abegnoli et al. | 370/392 |
| 2008/0205415 A1* | 8/2008 | Morales | 370/401 |
| 2008/0271132 A1* | 10/2008 | Jokela et al. | 726/1 |
| 2008/0304457 A1* | 12/2008 | Thubert et al. | 370/338 |
| 2009/0187649 A1* | 7/2009 | Migault et al. | 709/223 |
| 2009/0271865 A1 | 10/2009 | Jiang | |
| 2010/0034381 A1* | 2/2010 | Trace et al. | 380/255 |
| 2010/0036959 A1* | 2/2010 | Trace et al. | 709/228 |
| 2010/0061380 A1 | 3/2010 | Barach et al. | |
| 2010/0077462 A1* | 3/2010 | Joffe et al. | 726/5 |
| 2010/0142382 A1 | 6/2010 | Jungck et al. | |
| 2010/0217890 A1 | 8/2010 | Nice et al. | |
| 2010/0228813 A1 | 9/2010 | Suzuki et al. | |
| 2010/0274885 A1 | 10/2010 | Yoo et al. | |
| 2011/0038377 A1 | 2/2011 | Haddad | |
| 2011/0154132 A1 | 6/2011 | Aybay | |
| 2011/0211553 A1 | 9/2011 | Haddad | |
| 2011/0283018 A1* | 11/2011 | Levine et al. | 709/245 |
| 2011/0292857 A1 | 12/2011 | Sarikaya et al. | |
| 2011/0307629 A1 | 12/2011 | Haddad | |
| 2012/0005372 A1 | 1/2012 | Sarikaya et al. | |
| 2012/0047571 A1* | 2/2012 | Duncan et al. | 726/13 |
| 2012/0054497 A1* | 3/2012 | Korhonen | 713/179 |
| 2012/0059934 A1 | 3/2012 | Rafiq et al. | |
| 2012/0110210 A1 | 5/2012 | Huang et al. | |
| 2012/0117379 A1 | 5/2012 | Thornewell et al. | |
| 2012/0174217 A1 | 7/2012 | Ormazabal | |
| 2012/0259998 A1 | 10/2012 | Kaufman | |
| 2012/0284296 A1 | 11/2012 | Arifuddin et al. | |
| 2013/0007870 A1 | 1/2013 | Devarajan et al. | |
| 2013/0100815 A1 | 4/2013 | Kakadia et al. | |
| 2013/0103805 A1 | 4/2013 | Lyon | |
| 2013/0151725 A1 | 6/2013 | Baginski et al. | |
| 2013/0166715 A1 | 6/2013 | Yuan et al. | |
| 2013/0201999 A1 | 8/2013 | Savolainen et al. | |
| 2013/0205035 A1 | 8/2013 | Chen | |
| 2013/0205040 A1 | 8/2013 | Naor et al. | |
| 2013/0340079 A1 | 12/2013 | Gottlieb et al. | |

OTHER PUBLICATIONS

RFC 4033, Resource Records for the DNS Security Extensions, Arends et al., Network Working Group, Mar. 2005.*

RFC 2535, Domain Name System Security Extensions, Eastlake, Network Working Group, Mar. 2005.*

RFC 3972, Cryptographically Generated Addresses (CGA), Aura, Network Working Group, Mar. 2005.*

DNSSEC Operational Impact and Performance, Guillard, Proceedings of the International Multi-Conference on Computing in the Global Information Technology (ICCGI'06), IEEE, 2006.*

RFC 3142, an IPv6-to-IPv4 Transport Relay Translator, Hagino et al., Network Working Group, Jun. 2001.*

RFC 2529, Transmission of IPv6 over IPv4 Domains without Explicit Tunnels, Carpenter et al., Network Working Group, Mar. 1999.*

NCTU SLT: A Socket-layer Translator for IPv4-IPv6 Translation, Chen et al., IEEE Communications Letters, vol. 9 No. 10, Oct. 2005.*

IPv6 Integration and Coexistence Strategies for Next-Generation Networks, Tatipamula et al., IEEE Communications Magazine, Jan. 2004.*

Forrester Research, Inc., "DNSSEC Ready for Prime Time", Forrester Research, Inc. Cambridge, MA (Jul. 2010).

Bagnulo, et al., "DNS extensions for Network Address translation from IPv6 Clients to IPv4 Servers", IEFT Trust (Jul. 2010).

Thomson, et al., "DNS Extensions to Support IP Version 6", The Internet Society (Oct. 2003).

Wikipedia, "List of DNS record types", retrieved from Internet URL: http://en.wikipedia.org/wiki/List_of_DNS_record_types (Jun. 2010).

Wikipedia, "IPv6", retrieved from Internet URL: http://en.wikipedia.org/wiki/IPv6 (Jun. 2010).

Wikipedia, "Domain Name System Security Extensions", retrieved from Internet URL: http://en.wikipedia.org/wiki/DNSSEC (Jun. 2010).

Dan Kaminsky, (slideshow presentation) "Black Ops of Fundamental Defense: Introducing the Domain Key Infrastructure", retrieved from Internet URL: http://www.slideshare.net/RecursionVentures/dki-2, (Aug. 2010).

Arends et al., "Protocol Modifications for the DNS Security Extensions," Network Working Group, RFC 4035, Mar. 1, 2005, 54 pages, The Internet Society.

International Search Report and Written Opinion for PCT/US2011/054331, Mar. 13, 2012, 13 pages.

Meyer et al., "F5 and Infoblox DNS Integrated Architecture: Offering a Complete Scalable, Secure DNS Solution," F5 Technical Brief, Feb. 2, 2010, 18 pages, URL: http://web.archive.prg/web/20100326145019/http://www.f5.com/pdf/white-papers/infoblox-wp.pdf.

Weiler et al., "Minimally Covering NSEC Records and DNSSEC On-line Signing," Network Working Group, RFC 4470, Apr. 2006, 8 pages, The Internet Society.

Bau et al., "A Security Evaluation of DNSSEC with NSEC3," Mar. 2, 2010; updated version corrects and supersedes a paper in the NDSS' 10 proceedings, pp. 1-17.

"BIG-IP® Global Traffic Manager," <http://www.f5.com/products/big-ip/product-modules/global-traffic-manager.html>, last accessed Jul. 6, 2010, 2 pages.

"BIG-IP® Global Traffic Manager™ and BIG-IP Link Controller™ : Implementations," Manual 0304-00, Dec. 3, 2009, pp. 1-161, version 10.1, F5 Networks, Inc.

"BIG-IP® Systems: Getting Started Guide," Manual 0300-00, Feb. 4, 2010, pp. 1-102, version 10.1, F5 Networks, Inc.

"Detail Requirement Report: RQ-GTM-0000024," <http://fpweb/fptopic.asp?REQ=RQ-GTM-0000024>, F5 Networks, Inc., 1999, printed Mar. 31, 2010, 2 pages.

"Detail Requirement Report: RQ-GTM-0000028," <http://fpweb/fptopic.asp?REQ=RQ-GTM-0000028>, F5 Networks, Inc., 1999, printed Mar. 31, 2010, 2 pages.

"DNS DDOS Protection Functional Spec," BigipDNSDDOSProtectionFS<TMO<TWiki, last accessed Mar. 31, 2010, 2 pages.

"DNSSEC Functional Spec," TMOSDnsSECFS<TMOS<TWiki, last accessed on Mar. 31, 2010, pp. 1-10.

"DNS Security (DNSSEC) Solutions," <http://www.f5.com/solutions/security/dnssec>, F5 Networks, Inc., printed Aug. 23, 2010, pp. 1-4.

"F5 and Infoblox Provide Customers with Complete DNS Security Solution," <http://www.f5.com/news-press-events/press/2010/20100301.html>, Mar. 1, 2010, 2 pages, F5 Networks, Inc., Seattle and Santa Clara, California.

"F5 Solutions Enable Government Organizations to Meet 2009 DNSSEC Compliance," .<http://www.f5.com/news-press-events/press/2009/20091207.html>, Dec. 7, 2009, 2 pages, F5 Networks, Inc., Seattle, California.

Higgins, Kelly Jackson, "Internet Infrastructure Reaches Long-Awaited Security Milestone," Tech Center: Security Services, <http//www.darkreading.com/securityservices/security/management/showArticle.jhtml?article>, Jul. 28, 2010. pp. 1-4.

Howarth, Fran, "Investing in security versus facing the consequences," White Paper, Bloor Research, Sep. 2010, pp. 1-15.

Laurie et al., "DNS Security (DNSSEC) Hashed Authenticated Denial of Existence," Network Working Group, RFC 5155, Feb. 2008, pp. 1-51.

MacVittie, Lori, "It's DNSSEC Not DNSSUX," DevCentral>Weblogs, <http://devcentral.f5.com/weblogs/macvittie/archive/2009/11/18/itrsquos-dnssec-not-dnssux.aspx>, posted on Nov. 18, 2009, accessed on Jul. 6, 2010, pp. 3-7.

"PDR/CDR for RQ-GTM-0000028," BigipDNSDDOSProtectionPDR<TMOS<TWiki, last accessed on Mar. 31, 2010, pp. 1-14.

Silva, Peter, "DNSSEC: The Antidote to DNS Cache Poisoning and Other DNS Attacks," F5 Technical Brief, 2009, pp. 1-10.

* cited by examiner

METHODS FOR HANDLING REQUESTS BETWEEN DIFFERENT RESOURCE RECORD TYPES AND SYSTEMS THEREOF

TECHNOLOGICAL FIELD

This technology generally relates to network communications, and more particularly, to systems and methods for handling requests between different resource record types.

BACKGROUND

Computer networks (e.g., the Internet) are making a slow and painful transition from Internet Protocol version 4 (IPv4) to Internet Protocol version 6 (IPv6): slow because deploying IPv6 is most useful if all network devices deploying IPv6 (the "network effect") and painful because it requires software and/or hardware updates. One example solution is DNS64 that is an exemplary mechanism for synthesizing AAAA resource records (or, quad-A records) used in IPv6 from A records used in IPv4. However, a downstream validator will mark a synthesized AAAA resource record type as invalid if DNS64 software, which is positioned between the DNS client requesting an AAAA resource record address and a DNS server, has performed the synthesis of the AAAA resource record, but cannot sign the synthesized AAAA resource record. This happens because conventional technologies do not validate the synthesized AAAA resource record. When conversion to IPv6 (for the AAAA response from an A response, which is a different resource record type from the AAAA response) is performed, the original Resource Record Signature (RRSIG) associated with the IPv4 A resource record type becomes invalid. As a result, conventional implementations of DNS64 break Domain Name System Security Extensions (DNSSEC). Unfortunately, using conventional technology invalidated AAAA resource record responses are obtained that pose security threat for client devices requesting the resource records, and defeat the purpose of DNSSEC itself.

SUMMARY

One example of the technology is a method for handling requests between different resource record types. The method includes receiving at a traffic management device a first resource record type from one or more server devices in response to a request from a client device. The traffic management device validates the first resource record type, and creates a second resource record type corresponding to the first resource record type after the validating. Signing the second resource record type at the traffic management device is carried out for servicing the request from the client device.

Another example includes a computer readable medium having stored thereon instructions for handling requests between different resource record types, which when executed by at least one processor, causes the processor to perform a number of steps. The steps include receiving at a traffic management device a first resource record type from one or more server devices in response to a request from a client device. Additionally, the steps include validating at the traffic management device the first resource record type, and creating a second resource record type corresponding to the first resource record type after the validating. Signing the second resource record type at the traffic management device is carried out for servicing the request from the client device.

Another example is that of a traffic management device, which includes one or more processors executing one or more traffic management applications, a memory coupled to the one or more processors by a bus, a network interface controller coupled to the one or more processors and the memory and configured to receive data packets from a network that relate to the executing traffic management applications, and handle requests between different resource record types. In this example, at least one of the one or more processors is configured to execute programmed instructions stored in the memory and the network interface controller including logic capable of being further configured to implement receiving at a traffic management device a first resource record type from one or more server devices in response to a request from a client device. The implementation includes validating at the traffic management device the first resource record type, and creates a second resource record type corresponding to the first resource record type after the validating. Signing the second resource record type at the traffic management device is carried out for servicing the request from the client device.

The examples offer numerous advantages for secure handling of requests and conversion to requests from one resource record type to another dynamically in real-time or "on-the-fly." By way of example only, technology disclosed enables real-time dynamic deployment of DNSSEC proxy for DNS64 by which a complete trust relationship or a chain of trust between IPv4 environment and IPv6 environment is maintained. Even when an AAAA record is synthesized by the DNS64 device (e.g., a traffic management device), the chain of trust is maintained since the synthesized AAAA record is validated by attaching a signature at the DNS64 device where such synthesis occurs. Therefore, such a validation of the synthesized or created AAAA resource record, which is an exemplary resource record type, when the requested resource record type is not obtained from servers, enables valid responses to requests, and thereby complies with DNSSEC for the responding devices (e.g., servers). It is to be noted although AAAA and A resource record types are being discussed in the examples, the technology is applicable to other types of resource records including but not limited to Andrew File System Database (AFSDB) records, Canonical Name records (CNAME), Host Information (HINFO) records, Integrated Services Digital Network (ISDN) records, Location (LOC) records, Mail Exchanger (MX) records, Mail Group (MG) records, Mailbox (MB) records, Mailbox Information (MINFO) records, Mailbox Rename (MR) records, Name Server (NS) records, Network Service Access Protocol (NSAP) records, Public Key (KEY) records, Responsible Person (RP) records, Reverse-lookup Pointer (PTR) records, Route Through (RT) records, Start of Authority (SOA) records, Text (TXT) records, Well-Known Services (WKS) records, X.400 Address Mapping (PX) records, X25 Address Mapping (X25) records, and the like. These and other advantages, aspects, and features will become more apparent from the following detailed description when viewed in conjunction with the accompanying drawings. Non-limiting and non-exhaustive examples are described with reference to the following drawings. Accordingly, the drawings and descriptions below are to be regarded as illustrative in nature, and not as restrictive or limiting.

DETAILED DESCRIPTION

Various examples of the technology disclosed enable a traffic management device 110 to handle requests from client devices that are of a first resource record type and service those requests based upon the responses from server devices that are of a different or of second resource record type. For example, client devices operating in an IPv6 only environment need to communicate with servers operating in an IPv4 only environment. Traffic management device 110 provides validating of responses, synthesized at the traffic management device 110, or received from servers, in response to the requests. In one example, traffic management device 110 validates AAAA resource record types for IPv6 client devices, which AAAA resource records are created at the traffic management device 110 itself when there is an IPv4 A resource record type response from the servers, such that the synthesized AAA resource record type corresponds to the A resource record type received by the traffic management 110.

Figure 1:
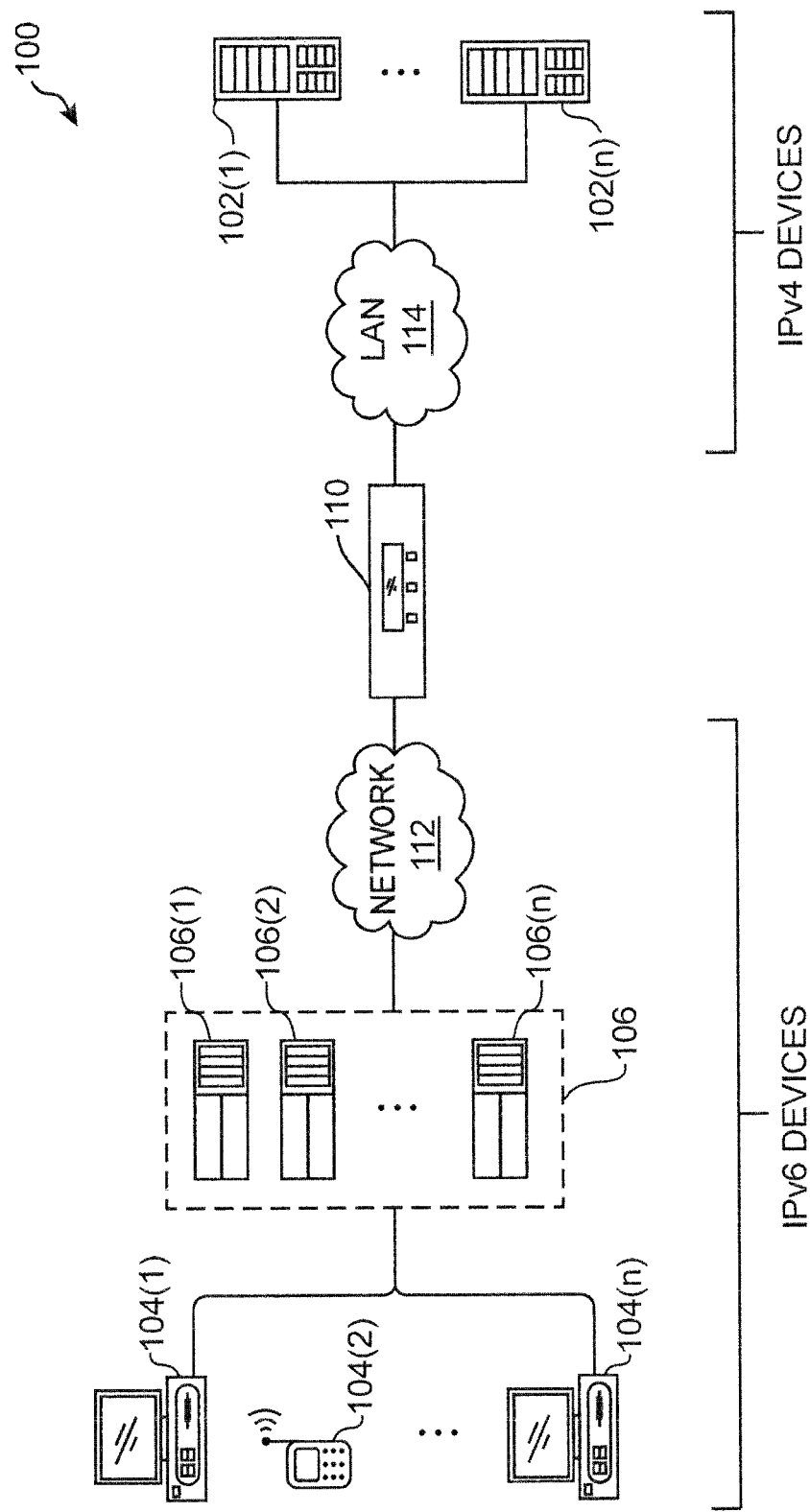
FIG. 1 illustrates an exemplary network system environment using a traffic management device for handling requests between different resource record types.

Referring to FIG. 1, an exemplary network system 100 including traffic management device 110 that is configured to handle requests between different resource record types is illustrated. By way of example only, a network 112 can receive requests and provide responses according to the Hyper-Text Transfer Protocol (HTTP) based application, various request for comments (RFC) document guidelines or the Common Internet File System (CIFS) or network file system (NFS) protocol in this example, although the principles discussed herein are not limited to these examples and can include other application protocols and other types of requests (e.g., File Transfer Protocol (FTP) based requests). The exemplary network system 100 can include a series of one or more client devices such as client computers 104(1) to 104(n). Client computers 104(1)-104(n) are coupled to traffic management device 110 via a plurality of load balancing devices 106, including load balancing devices 106(1)-106(n), each having a unique network address based upon the resource record type format (e.g., a unique 128 bit IPv6 address). Traffic management device 110 is interposed in between servers 102(1) to 102(n) and the client devices 104(1) to 104(n) for providing one or more communication channels through network 112 and a Local Area Network (LAN) 114, although other communication channels may be directly established between various devices in network system 100 without network 112 and/or LAN 114. For clarity and brevity, in FIG. 1 two server devices 102(1) and 102(n) are shown, but it should be understood that any number of server devices can use the exemplary network system 100. Likewise, three client devices 104(1), 104(2), 104(n) and one traffic management device 110 are shown in FIG. 1, but any number of client devices and traffic management devices can also use the exemplary network system 100 as well. Although network 112 and LAN 114 are shown, other numbers and types of networks could be used. The ellipses and the designation "n" denote an unlimited number of server devices and client devices, respectively.

Servers 102(1)-102(n) (also referred to as server devices 102(1)-102(n)) comprise one or more server computing machines or devices capable of operating one or more Web-based applications that may be accessed by network devices in the network 112, such as client computers 104(1)-104(n), via the plurality of load balancers 106 and traffic management device 110, and may provide other data representing requested resources, such as domain name services and zones, particular Web page(s) corresponding to URL request(s), image(s) of physical objects, and any other objects, responsive to the requests, although the servers 102(1)-102(n) may perform other tasks and provide other types of resources. In this example, at least one of the servers 102(1)-102(n) is an IPv4 only device that caters to various requests made by client computers 104(1)-104(n). Alternatively or generally, servers 102(1)-102(n) can be a set of devices providing resource record responses that are of a different type from the resource record types requested and handled by client computers 104(1)-104(n). It should be noted that while only two servers 102(1) and 102(n) are shown in the network system 100 depicted in FIG. 1, other numbers and types of servers may be coupled to the traffic management device 110. It is also contemplated that one or more of the servers 102(1)-102(n) may be a cluster of servers managed by a network traffic management device such as traffic management device 110.

The client computers 104(1)-104(n) in this example (also interchangeably referred to as client devices 104(1)-104(n), client computing devices 104(1)-104(n), clients 104(1)-104(n), and client computing systems 104(1)-104(n)) can run interface applications such as Web browsers that can provide an interface to make requests for and send data, including IPv6 requests, to different Web server-based applications via one or more load balancing devices 106(1)-106(n) connected to the network 112 and/or via traffic management device 110. A series of network applications can run on the servers 102(1)-102(n) that allow the transmission of data that is requested by the client computers 104(1)-104(n). Servers 102(1)-102(n) can provide data or receive data in response to requests directed toward the respective applications on the servers 102(1)-102(n) from the client computers 104(1)-104(n). For example, as per the Transmission Control Protocol (TCP), packets can be sent to the servers 102(1)-102(n) from the requesting client computers 104(1)-104(n) to send data, although other protocols (e.g., FTP) may be used. It is to be understood that the servers 102(1)-102(n) can be hardware or software executing on and supported by hardware, or can represent a system with multiple servers, which can include internal or external networks. Servers 102(1)-102(n) can be domain name servers with Domain Name System (DNS) capabilities hosting one or more website zones.

Generally, the client devices such as the client computers 104(1)-104(n) can include virtually any computing device capable of connecting to another computing device to send and receive information, including Web-based information. The set of such devices can include devices that typically connect using a wired (and/or wireless) communications medium, such as personal computers (e.g., desktops, laptops), mobile and/or smart phones and the like, as illustrated in FIG. 1. For example, client device 104(2) is a mobile telephone device or a smart-phone with network capabilities in addition to audio capabilities. In this example, the client devices can run browsers and other types of applications (e.g., web-based applications) that can provide an interface to make one or more requests to different server-based applications via network 112, although requests for other types of network applications and resources, for example URLs, may be made by client computers 104(1)-104(n). Client computers 104(1)-104(n) can be configured to make IPv6 AAAA resource record type requests to servers 102(1)-102(n), via various types of traffic management devices (e.g., routers, load balancers, application delivery controllers, and the like).

Client computers 104(1)-104(n) can submit requests through the plurality of load balancing devices 106 that forward the request to a local or a global traffic management device 110 for analysis, as will be discussed below. In one example load balancing devices 106(1)-106(n) are NAT64 devices, although other types of load balancers with Network Address Translation (NAT) capabilities and/or additional capabilities may be used, as can be contemplated by one of ordinary skill in the art after reading this disclosure. In some examples, traffic management device 110 may be a part of the plurality of load balancing devices 106.

A series of Web-based and/or other types of protected and unprotected network applications can run on servers 102(1)-102(n) that allow the transmission of data that is requested by the client computers 104(1)-104(n). The client computers 104(1)-104(n) can be further configured to engage in a secure communication directly with the traffic management device 110 and/or the servers 102(1)-102(n), via plurality of load balancing devices 106, Local Domain Name Servers (LDNSs), or otherwise, using mechanisms such as Secure Sockets Layer (SSL), Internet Protocol Security (IPSec), Transport Layer Security (TLS), and the like.

In this example, network 112 comprises a publicly accessible network, such as the Internet, which includes client computers 104(1)-104(n), although network 112 may comprise other types of private and public networks that include other devices. Communications, such as requests from client computers 104(1)-104(n) and responses from servers 102(1)-102(n), take place over network 112 according to standard network protocols, such as the HTTP and TCP/IP protocols in this example, but the principles discussed herein are not limited to this example and can include other protocols (e.g., FTP). Further, network 112 can include local area networks (LANs), wide area networks (WANs), direct connections, other types and numbers of network types, and any combination thereof. On an interconnected set of LANs or other networks, including those based on different architectures and protocols, routers, switches, hubs, gateways, bridges, crossbars, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links, optical fibers, and other communications links known to those of ordinary skill in the relevant arts. Generally, network 112 includes any communication medium and method by which data may travel between client devices 104(1)-104(n), servers 102(1)-102(n), and traffic management device 110, and these devices are provided by way of example only.

In this example, each of the servers 102(1)-102(n), traffic management device 110, load balancing devices 106, and client computers 104(1)-104(n) can include a central processing unit (CPU), controller or processor, a memory, and an interface system which are coupled together by a bus or other link, although other numbers and types of each of the components and other configurations and locations for the components can be used. Since these devices are well known to those of ordinary skill in the relevant art(s), they will not be described in further detail herein.

In addition, two or more computing systems or devices can be substituted for any one of the systems in the network system 100. Accordingly, principles and advantages of cloud computing and/or distributed processing, such as redundancy, replication, virtualization, and the like, can also be implemented, as appropriate, to increase the robustness and performance of the devices and systems of the network system 100. The network system 100 can also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, combination(s) thereof, and the like.

By way of example only and not by way of limitation, LAN 114 comprises a private local area network that includes the traffic management device 110 coupled to the one or more servers 102(1)-102(n), although the LAN 114 may comprise other types of private and public networks with other devices. Networks, including local area networks, besides being understood by those of ordinary skill in the relevant art(s), have already been described above in connection with network 112, and thus will not be described further here.

As shown in the example environment of network system 100 depicted in FIG. 1, the traffic management device 110 can be interposed between the network 112 and the servers 102(1)-102(n) coupled via LAN 114 as shown in FIG. 1. Alternatively, traffic management device 110 may be a part of the plurality of load balancing devices 110 at the periphery of network 112 and coupled to LAN 114 and/or servers 102(1)-102(n). Again, the network system 100 could be arranged in other manners with other numbers and types of devices. Also, the traffic management device 110 is coupled to network 112 by one or more network communication links, and intermediate network devices, such as routers, switches, gateways, hubs, crossbars, and other devices. It should be understood that the devices and the particular configuration shown in FIG. 1 are provided for exemplary purposes only and thus are not limiting. Although a single traffic management device 110, additional traffic management devices may be coupled in series and/or parallel to the traffic management device 110, thereby forming a cluster, depending upon specific applications, and the single traffic management device 110 shown in FIG. 1 is by way of example only, and not by way of limitation.

Generally, the traffic management device 110 manages network communications, which may include one or more client requests and server responses, to/from the network 112 between the client computers 104(1)-104(n) and one or more of the servers 102(1)-102(n) in LAN 114 in these examples. These requests may be destined for one or more servers 102(1)-102(n), and, as alluded to earlier, may take the form of one or more TCP/IP data packets originating from the network 112, passing through one or more intermediate network devices and/or intermediate networks, until ultimately reaching the traffic management device 110, for example. When originating at client computers 104(1)-104(n), these requests are in a first resource record type format (e.g., IPv6 quad-A resource record type request or query), which requests are serviced by servers 102(1)-102(n) which provide responses in a different type of resource record format (e.g., IPv4 A resource record type response).

In one example, traffic management device 110 is configured as a global server load balancing device to distribute end-user application requests based on business policies, data center conditions, network conditions, user location, and application performance, such that each request from client computers 104(1)-104(n) is automatically directed to the closest or best-performing data center hosting one or more servers 102(1)-102(n). Although in this example, traffic management device 110 has global server load balancing capabilities, in alternative examples traffic management device 110 may be a local traffic management device that receives responses from a global server load balancing (GSLB) device coupled to LAN 114. By way of example only, such a global load balancing device can be a BIG-IP® Global Traffic Manager™ provided by F5 Networks, Inc., of Seattle, Wash. Further, it is to be noted although traffic management device 110 is shown separate from the plurality of load balancing devices 106, in some examples traffic management device 110 can itself be one of the plurality of load balancing devices 106.

In addition, as discussed in more detail with reference to FIGS. 2-3, traffic management device 110 is configured to handle requests between different resource record types (e.g., IPv6 quad-A requests for IPv4 A resource records from servers 102(1)-102(n)). In any case, the traffic management device 110 may manage the network communications by performing several network traffic management related functions involving network communications, secured or unsecured, such as load balancing, access control, VPN hosting, network traffic acceleration, encryption, decryption, cookie, and key management and providing authenticated domain name service in accordance with the systems and processes described further below in connection with FIGS. 2-3, for example.

Figure 2:
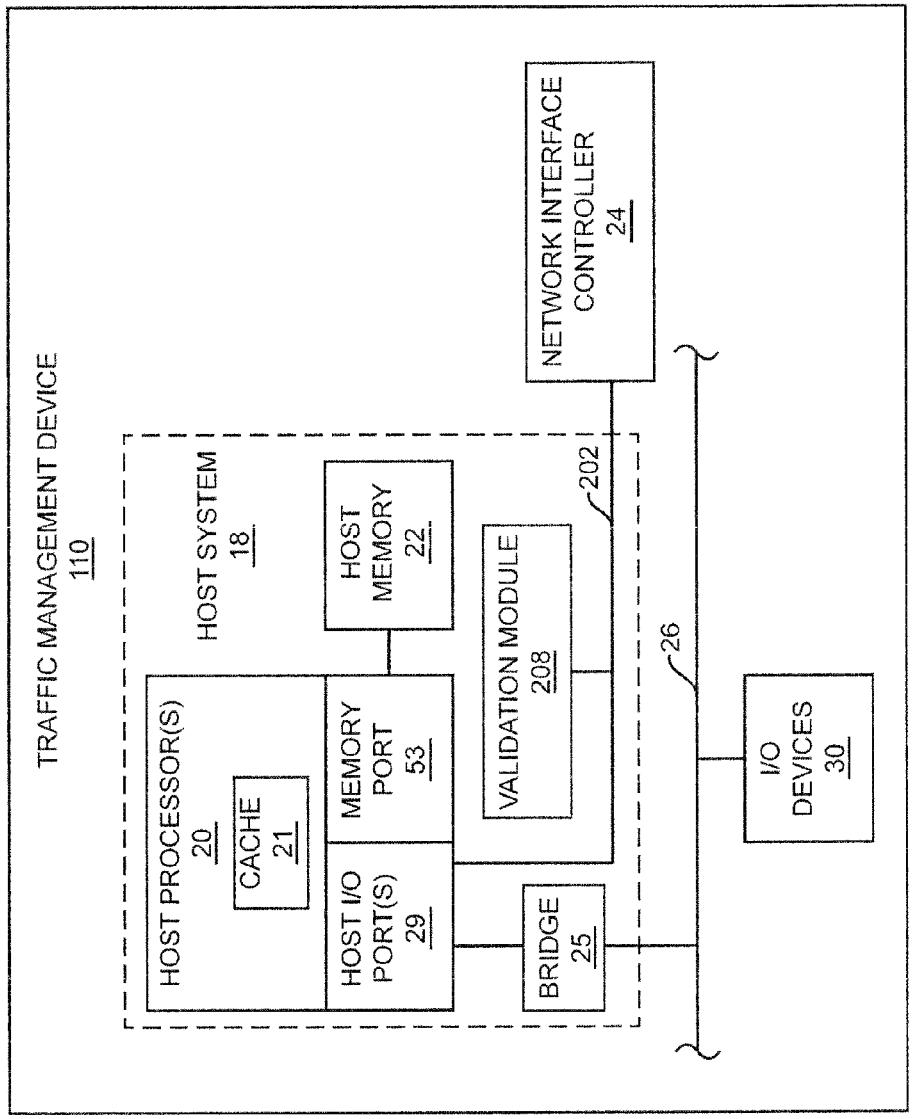
FIG. 2 is a partly schematic and partly functional block diagram of the traffic management device in the exemplary network environment of FIG. 1.

Referring to FIG. 2, an exemplary traffic management device 110 is illustrated. Included within the traffic management device 110 is a system bus 26 (also referred to as bus 26) that communicates with a host system 18 via a bridge 25 and with an input-output (I/O) device 30. In this example, a single I/O device 30 is shown to represent any number of I/O devices connected to bus 26. In one example, bridge 25 is in further communication with a host processor 20 via host input output (I/O) ports 29. Host processor 20 can further communicate with a network interface controller 24 via a CPU bus 202, a host memory 22 (via a memory port 53), and a cache memory 21. As outlined above, included within the host processor 20 are host I/O ports 29, memory port 53, and a main processor (not shown separately). In this example, host system 18 includes a validation module 208 that includes algorithms and instructions/code stored thereupon to validate and sign resource records created at the traffic management device 110 by attaching resource record signatures (RRSIGs) to the synthesized resource record types (e.g., synthesized IPv6 AAAA resource record types). It is to be noted validation module 208 may be implemented as hardware logic circuitry, or as a combination of logic circuitry with code executing thereupon. Further, although validation module 208 is illustrated as a single module/block, the functionality of validation module 208 can be implemented in a distributed manner among various components of traffic management device 110. Furthermore, validation module 208 may be implemented as a standalone device that can be directly interfaced with traffic management device 110 via standard interface ports.

In one example, traffic management device 110 can include the host processor 20 characterized by anyone of the following component configurations: computer readable medium and logic circuits that respond to and process instructions fetched from the host memory 22; a microprocessor unit, such as: those manufactured by Intel Corporation of Santa Clara, Calif.; those manufactured by Motorola Corporation of Schaumburg, Ill.; those manufactured by Transmeta Corporation of Santa Clara, Calif.; the RS/6000 processor such as those manufactured by International Business Machines of Armonk, N.Y.; a processor such as those manufactured by Advanced Micro Devices of Sunnyvale, Calif.; or any other combination of logic circuits capable of executing the systems and methods described herein. Still other examples of the host processor 20 can include any combination of the following: a microprocessor, a microcontroller, a central processing unit with a single processing core, a central processing unit with two processing cores, or a central processing unit with more than one processing core.

Examples of the traffic management device 110 include one or more application delivery controller devices of the BIG-IP® product family provided by F5 Networks, Inc. of Seattle, Wash., although other types of traffic management devices may be used. In an exemplary structure and/or arrangement, traffic management device 110 can include the host processor 20 that communicates with cache memory 21 via a secondary bus also known as a backside bus, while another example of the traffic management device 110 includes the host processor 20 that communicates with cache memory 21 via the system bus 26. The local system bus 26 can, in some examples, also be used by the host processor 20 to communicate with more than one type of I/O devices 30. In some examples, the local system bus 26 can be anyone of the following types of buses: a VESA VL bus; an ISA bus; an EISA bus; a Micro Channel Architecture (MCA) bus; a PCI bus; a PCI-X bus; a PCI-Express bus; or a NuBus. Other example configurations of the traffic management device 110 include I/O device 30 that is a video display (not shown separately) that communicates with the host processor 20 via an Advanced Graphics Port (AGP). Still other versions of the traffic management device 110 include host processor 20 connected to I/O device 30 via any one or more of the following connections: HyperTransport, Rapid I/O, or InfiniBand. Further examples of the traffic management device 110 include a communication connection where the host processor 20 communicates with one I/O device 30 using a local interconnect bus and with a second I/O device (not shown separately) using a direct connection. As described above, included within some examples of the traffic management device 110 is each of host memory 22 and cache memory 21. The cache memory 21, will, in some examples, be any one of the following types of memory: SRAM; BSRAM; or EDRAM. Other examples include cache memory 21 and host memory 22 that can be anyone of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ES-DRAM), SyncLink DRAM (SLDRAM), Direct Rambus DRAM (DRDRAM), Ferroelectric RAM (FRAM), or any other type of memory device capable of executing the systems and methods described herein.

The host memory 22 and/or the cache memory 21 can, in some examples, include one or more memory devices capable of storing data and allowing any storage location to be directly accessed by the host processor 20. Such storage of data can be in a local database internal to traffic management device 110, or external to traffic management device 110 coupled via one or more input output ports of network interface controller 24. Further examples of traffic management device 110 include a host processor 20 that can access the host memory 22 via one of either: system bus 26; memory port 53; or any other connection, bus or port that allows the host processor 20 to access host memory 22.

One example of the traffic management device 110 provides support for anyone of the following installation devices:

ZIP disks, a CD-ROM drive, a CD-R/RW drive, a DVD-ROM drive, USB device, a bootable medium, a bootable compact disk (CD) used, for example, for GNU/Linux distribution such as KNOPPIX®, a hard-drive or any other device suitable for installing applications or software. Applications can, in some examples, include a client agent, or any portion of a client agent. The traffic management device 110 may further include a storage device (not shown separately) that can be either one or more hard disk drives, or one or more redundant arrays of independent disks (RAID); where the storage device is configured to store an operating system, software, programs applications, or at least a portion of the client agent. A further example of the traffic management device 110 includes an installation device that is used as the storage device.

Furthermore, the traffic management device 110 can include network interface controller 24 to communicate, via an input-output port inside network interface controller 24, with a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DEC-NET), broadband connections (e.g., ISDN, Frame Relay, ATM, Gigabit Ethernet, Ethernet-over-SONET), wireless connections, optical connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the traffic management device 110 includes network interface controller 24 configured to communicate with additional computing devices via any type and/or form of gateway or tunneling protocol such as Secure Socket Layer (SSL) or Transport Layer Security (TLS), or the Citrix Gateway Protocol manufactured by Citrix Systems, Inc. of Fort Lauderdale, Fla. Versions of the network interface controller 24 can comprise anyone of: a built-in network adapter; a network interface card; a PCMCIA network card; a card bus network adapter; a wireless network adapter; a USB network adapter; a modem; or any other device suitable for interfacing the traffic management device 110 to a network capable of communicating and performing the methods and systems described herein.

In various examples, the traffic management device 110 can include any one of the following I/O devices 30: a keyboard; a pointing device; a mouse; a gesture based remote control device; a biometric device; an audio device; track pads; an optical pen; trackballs; microphones; video displays; speakers; or any other input/output device able to perform the methods and systems described herein. Host I/O ports 29 may in some examples connect to multiple I/O devices 30 to control the one or more I/O devices 30. Some examples of the I/O devices 30 may be configured to provide storage or an installation medium, while others may provide a universal serial bus (USB) interface for receiving USB storage devices such as the USB Flash Drive line of devices manufactured by Twintech Industry, Inc. Still other examples of an I/O device 30 may be bridge 25 between the system bus 26 and an external communication bus, such as: a USB bus; an Apple Desktop Bus; an RS-232 serial connection; a SCSI bus; a FireWire bus; a FireWire 800 bus; an Ethernet bus; an Apple-Talk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus. According to some examples, traffic management device 110 includes validation module 208 integrated as part of host system 18 for carrying out various exemplary functions of signing resource record types (e.g., AAAA resource records) created at traffic management device 110 using, by way of example only, public key cryptography.

Accordingly, components of traffic management device 110 include one or more processors (e.g., host processor 20) executing one or more traffic management applications, memory (e.g., cache memory 21, and/or host memory 22) coupled to the one or more processors by a bus, network interface controller 24 coupled to the one or more processors and the host memory 22 and configured to receive data packets from a network that relate to the executing traffic management applications, and handle requests from client computers 104(1)-104(n) for a first resource record type, which requests are serviced by servers 102(1)-102(n) by way of responses in a second and different resource record type. In this example, at least one of the one or more processors is configured to execute programmed instructions stored in the memory (e.g., cache memory 21, and/or host memory 22) and the network interface controller 24 including logic capable of being further configured to implement receiving at a traffic management device a first resource record type from one or more server devices in response to a request from a client device. The implementation includes validating at the traffic management device the first resource record type, and creates a second resource record type corresponding to the first resource record type after the validating. Signing the second resource record type at the traffic management device (e.g., by validation module 208) is carried out for servicing the request from the client device.

The operation of example processes for handling requests between different resource record types (e.g., for providing DNSSEC proxy for DNS64) using, for example, traffic management device 110 shown in FIGS. 1-2, will now be described with reference back to FIGS. 1-2 in conjunction with flow diagram or flowchart 300 shown in FIG. 3, respectively. The flowchart 300 is representative of example machine readable instructions for implementing in dynamic real-time handling requests between different resource record types, for example, at the traffic management device 110. In this example, the machine readable instructions comprise an algorithm for execution by: (a) a processor (e.g., host processor 20), (b) a controller, and/or (c) one or more other suitable processing device(s) within host system 18, for example. The algorithm may be implemented in software stored on tangible computer readable media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or implemented in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, or the like). For example, at least some of the components of the traffic management device 110 could be implemented by software, hardware, and/or firmware. Also, some or all of the machine readable instructions represented by the process of flowchart 300 of FIG. 3 may be implemented manually at the traffic management device 110, for example, using a command line interface (CLI) prompt window operated by a system administrator. Further, although the example algorithm is described with reference to flowchart 300, persons of ordinary skill in the art will readily appreciate that many other methods of implementing the example machine readable instructions may alternatively be used. For example, the order of execution of the blocks in flowchart 300 may be changed, and/or some of the blocks described may be changed, eliminated, or combined.

Figure 3:
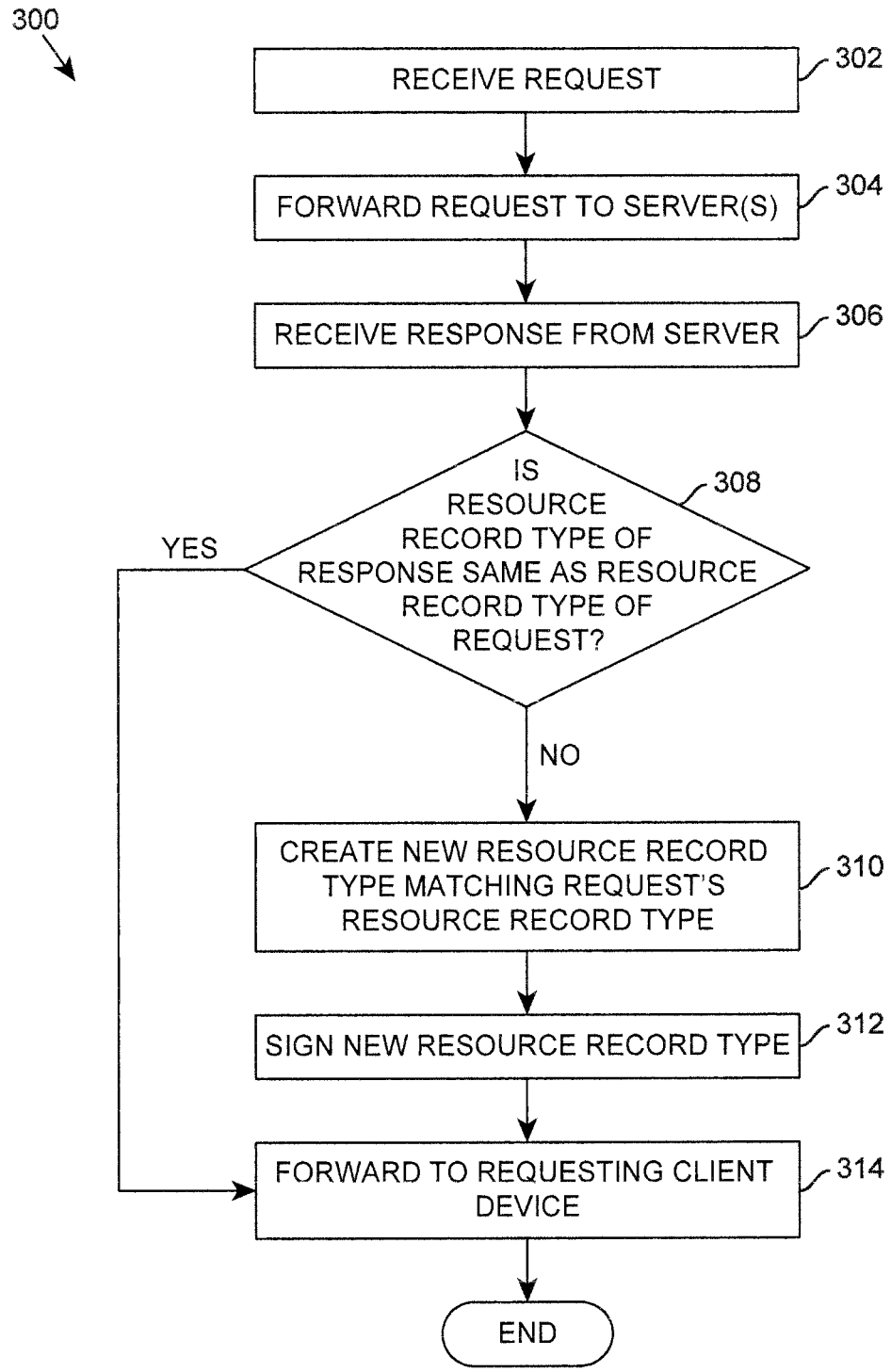
FIG. 3 is a flow chart of an exemplary process and method for handling requests between different resource record types.

Referring to FIG. 3, in step 302 of the flowchart 300, traffic management device 110 receives a request from one of client computers 104(1)-104(n). Generally, requests from client computers 104(1)-104(n) are for a resource record type that is different from a resource record type provided by one or more servers 102(1)-102(n) in response to the requests. In one example, the request from the client computers 104(1)-104(n) is a 128 bit IPv6 request or query (also referred to as a quad A or 'AAAA' request or query) for a resource provided by IPv4 devices (e.g., one or more servers 102(1)-102(n), the resource also referred to as an 'A' record that is a 32-bit IPv4 address). Since respective standard formats of IPv6 AAAA and IPv4 A resource record requests/query are known to those of ordinary skill in the art, they are not being described herein in detail. Further, other types of resource records may be used and IPv4 and IPv6 resource records are being discussed by way of example only, and not by way of limitation.

In step 304, traffic management device 110 forwards the received IPv6 request, e.g., in AAAA resource record format, to one of the servers 102(1)-102(n) after removing bits and/or headers to convert the request into an IPv4 request for an A resource record that can be understood by servers 102(1)-102(n). The removed bits and/or headers can at least partially be a part of a the 96-bit prefix that forms the IPv6 address. Since servers 102(1)-102(n) do not understand the IPv6 address format and are instead in an IPv4 network environment, removal of the prefix bits is useful in directing the request from the client computers 104(1)-104(n) to the appropriate one or more of servers 102(1)-102(n).

In step 306, traffic management device 110 receives a response from one of servers 102(1)-102(n) along with a resource record signature (RRSIG) associated with that response. The received response is validated for signature, for example, to determine it was from a trusted source among servers 102(1)-102(n). Validation can be performed, for example, using public key cryptography infrastructure implemented by validation module 208 in traffic management device 110, although other techniques for validation may be used.

In step 308, traffic management device 110 determines whether the received resource record type in the response is same as resource record type requested by the client device. When the resource record type of the received response is same as the resource record type requested, the flow proceeds to step 314 where traffic management device 110 forwards the received response after validation to the requesting one of client computers 104(1)-104(n). For example, if the received response is an IPv6 AAAA type response, traffic management device 110 simply forwards the response to the requesting one of the client computers 104(1)-104(n).

However, in step 310, when the response includes one or more address records in a different resource record type format (e.g., an IPv4 format or, an A resource record), traffic management device 110 creates a new resource record type corresponding to the received resource record type, but matching or corresponding to the request's resource record type format (e.g., an IPv6 AAAA resource record type with IPv4 A resource record network address included therein).

The flow then proceeds to step 312 where the new created response (e.g., the synthesized AAAA resource record) including the new resource record type is signed by traffic management device 110 in compliance with DNSSEC. In this scenario, when a new signature (e.g., a new RRSIG) is attached dynamically in real-time (or, "on-the-fly") by the traffic management device 110 to the new created IPv6 AAAA resource record type, the older signature corresponding to the IPv4 A resource record type response is discarded by the traffic management device since it is no more valid. By way of example only, and as discussed above, the signing of the synthesized resource record can be performed by validation module 208 using keys stored in the traffic management device 110 (e.g., in host memory 22), although other techniques for signing may be used. As a result, the signed AAAA resource record, although synthesized at traffic management device 110, maintains the chain of trust required by DNSSEC and is not rejected as invalid by additional downstream validators before reaching the requesting one of the client devices 110.

In step 314, the signed synthesized AAAA resource record is then forwarded to the requesting one of client computers 104(1)-104(n) as a response. It is to be noted although in this example IPv6 AAAA resource record is being referred to as the resource record type requested by the client computers 104(1)-104(n), the examples disclosed herein are equally valid for other resource record types, as long as the servers 102(1)-102(n) provide a response that is a different type of resource record which needs validation or conversion by synthesis to be of same resource record type as requested by client computers 104(1)-104(n), which is then validated, for example, by attaching a signature at the traffic management device 110.

Having thus described the basic concepts, it will be rather apparent to those skilled in the art that the foregoing detailed disclosure is intended to be presented by way of example only and is not limiting. Various alterations, improvements, and modifications will occur and are intended to those skilled in the art, though not expressly stated herein. The order that the measures and processes for providing secure application delivery are implemented can also be altered. Furthermore, multiple networks in addition to network 112 and LAN 114 could be associated with traffic management device 110 from/to which network packets can be received/transmitted, respectively. These alterations, improvements, and modifications are intended to be suggested by this disclosure, and are within the spirit and scope of the examples. Additionally, the recited order of processing elements or sequences, or the use of numbers, letters, or other designations therefore, is not intended to limit the claimed processes and methods to any order except as can be specified in the claims.

What is claimed is:

1. A method for handling requests between different resource record types, comprising:
   receiving by a traffic management device interposed between a client device and one or more server devices, a first resource record type from the one or more server devices in response to a request from the client device, wherein the first resource record type includes a resource record signature provided by the one or more server devices;
   validating by the traffic management device the first resource record type;
   creating by the traffic management device a second resource record type corresponding to the first resource record type after the validating; and
   creating by the traffic management device a new resource record signature at the traffic management device and attaching the new resource record signature to the second resource record type for servicing the request from the client device.

2. The method as set forth in claim 1, wherein the receiving comprises receiving a signature associated with the first resource record type, and wherein the signature is used for the validating.

3. The method as set forth in 1, wherein the validating is performed using public key cryptography.

4. The method as set forth in claim 1, wherein the first resource record type is a 32 bit Internet Protocol version 4 (IPv4) A resource record type and the second resource record type is a 128 bit Internet Protocol version 6 (IPv6) AAAA resource record type.

5. The method as set forth in claim 4, wherein the request from the client device is an IPv6 request.

6. The method as set forth in claim 5 further comprising:
determining by the traffic management device whether when the one or more server devices can directly provide a signed IPv6 resource record type in response to the IPv6 request, wherein the receiving, the validating, the creating, and the signing are performed only when the one or more server device cannot provide an IPv6 resource record type in response to the IPv6 request from the client device.

7. The method as set forth in claim 1, wherein a signature used for validating the first resource record type is discarded after the validating, and wherein the signing comprises attaching a new signature to the second resource record type prior to forwarding the signed second resource record type to the client device.

8. A non-transitory computer readable medium, having stored thereon instructions for handling requests between different resource record types comprising machine executable code which when executed by at least one processor, causes the processor to perform steps comprising:
receiving, by a traffic management device, a first resource record type from the one or more server devices in response to a request from the client device, wherein the first resource record type includes a resource record signature provided by the one or more server devices;
validating, by the traffic management device, the first resource record type;
creating, by the traffic management device, a second resource record type corresponding to the first resource record type after the validating; and
creating, by the traffic management device, a new resource record signature and attaching the new resource record signature to the second resource record type for servicing the request from the client device.

9. The medium as set forth in claim 8, wherein the receiving comprises receiving a signature associated with the first resource record type, and wherein the signature is used for the validating.

10. The medium as set forth in 8, wherein the validating is performed using public key cryptography.

11. The medium as set forth in claim 8, wherein the first resource record type is a 32 bit Internet Protocol version 4 (IPv4) A resource record type and the second resource record type is a 128 bit Internet Protocol version 6 (IPv6) AAAA resource record type.

12. The medium as set forth in claim 11, wherein the request from the client device is an IPv6 request.

13. The medium as set forth in claim 12, wherein the machine executable code which when executed by the at least one processor, causes the processor to perform steps further comprising:
determining whether when the one or more server devices can directly provide a signed IPv6 resource record type in response to the IPv6 request, wherein the receiving, the validating, the creating, and the signing are performed only when the one or more server device cannot provide an IPv6 resource record type in response to the IPv6 request from the client device.

14. The medium as set forth in claim 8, wherein a signature used for validating the first resource record type is discarded after the validating, and wherein the signing comprises attaching a new signature to the second resource record type prior to forwarding the signed second resource record type to the client device.

15. A traffic management device interposed between one or more server devices and a client device, the traffic management device comprising:
one or more processors;
a memory coupled to the one or more processors by a bus; and
a network interface controller coupled to the one or more processors and the memory and configured to be capable of receiving and forwarding data packets from a network that relate to a plurality of applications, at least one of the one or more processors configured to be capable of executing execute programmed instructions stored in the memory or the network interface controller with logic configured to implement, comprising:
receiving a first resource record type from one or more server devices in response to a request from a client device, wherein the first resource record type includes a resource record signature provided by the one or more server devices;
validating the first resource record type;
creating a second resource record type corresponding to the first resource record type after the validating; and
creating a new resource record signature and attaching the new resource record signature to the second resource record type for servicing the request from the client device.

16. The device as set forth in claim 15, wherein the receiving comprises receiving a signature associated with the first resource record type, and wherein the signature is used for the validating.

17. The device as set forth in 15, wherein the validating is performed using public key cryptography.

18. The device as set forth in claim 15, wherein the first resource record type is a 32 bit Internet Protocol version 4 (IPv4) A resource record type and the second resource record type is a 128 bit Internet Protocol version 6 (IPv6) AAAA resource record type.

19. The device as set forth in claim 18, wherein the request from the client device is an IPv6 request.

20. The device as set forth in claim 19, wherein the at least one of the one or more processors is configured to be capable of executing execute programmed instructions stored in the memory or the network interface controller with logic configured to implement further comprising:
determining whether when the one or more server devices can directly provide a signed IPv6 resource record type in response to the IPv6 request, wherein the receiving, the validating, the creating, and the signing are performed only when the one or more server device cannot provide an IPv6 resource record type in response to the IPv6 request from the client device.

21. The device as set forth in claim 15, wherein a signature used for validating the first resource record type is discarded after the validating, and wherein the signing comprises attaching a new signature to the second resource record type prior to forwarding the signed second resource record type to the client device.

* * * * *